Jan. 1, 1952          J. J. JACOBSON          2,580,549
SKEWER ROASTER FRAME
Filed July 2, 1949
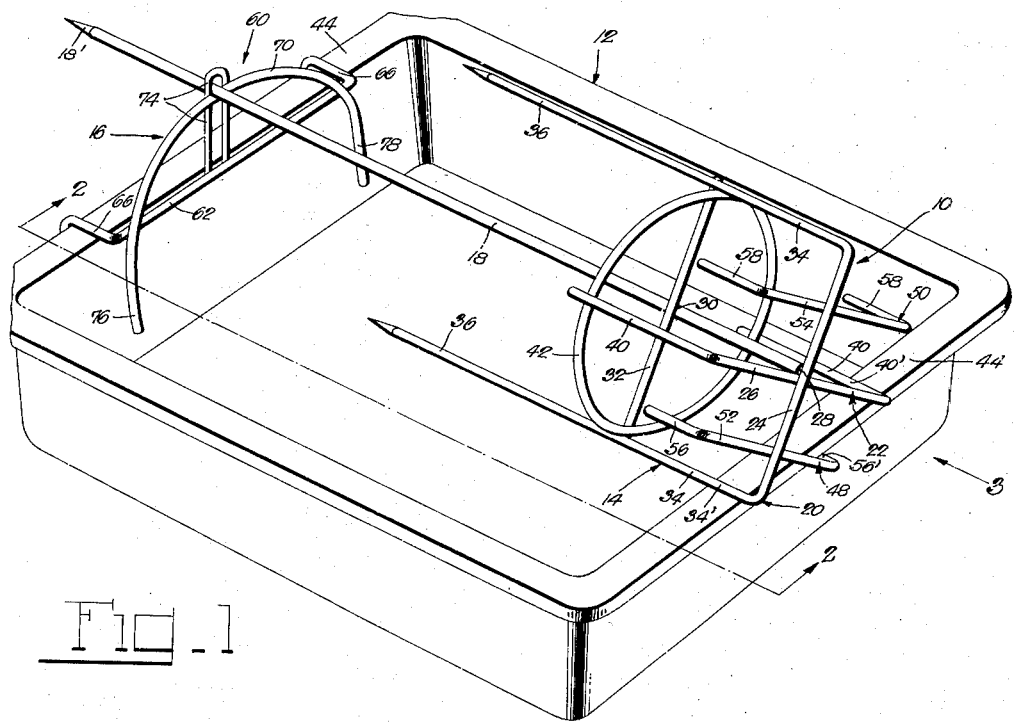
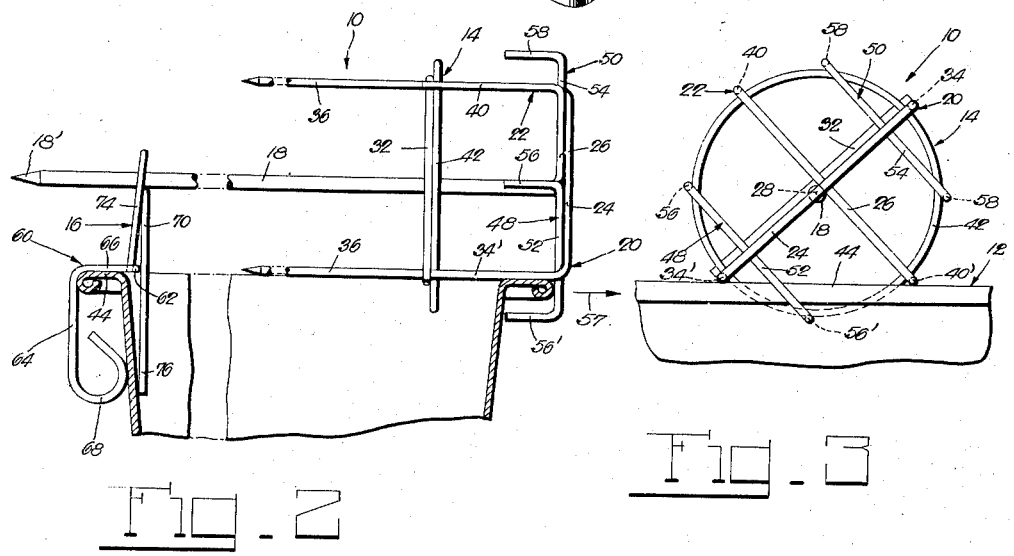
INVENTOR.
JAMES J. JACOBSON
BY Edwin Levisohn +
Harry Cohn
ATTORNEYS.

Patented Jan. 1, 1952

2,580,549

UNITED STATES PATENT OFFICE 2,580,549

SKEWER ROASTER FRAME

James J. Jacobson, New York, N. Y.

Application July 2, 1949, Serial No. 102,921

11 Claims. (Cl. 99—421)

This invention relates to culinary devices, and more particularly to culinary devices of the skewer roaster type.

It is an object of the present invention to provide a skewer roaster frame which is quickly detachably mountable on roasting pans of different sizes.

It is another object of the present invention to provide for ready turnability of the skewer of the roaster frame in its mounted condition, so as uniformly to subject a piece or pieces of food impaled on the skewer to the heat of a fire beneath the pan on which the frame is mounted.

It is another object of the present invention to make the skewer roaster frame of two separate sections of which one section is provided with a skewer and is placeable on a roasting pan in and hence turnable into pre-assigned angular positions thereon, while the skewer is so turnable in the other section, at any distance between both sections which the skewer may span, that the latter solely holds both sections in frame-forming relation in any of the pre-assigned angular positions of the turnable section.

It is another object of the present invention to provide a skewer roaster frame of this kind in which provisions are made for preventing turning movement of the turnable frame section from any of its pre-assigned angular positions, except by deliberate and intended manipulation by an attendant.

It is another object of the present invention to provide a skewer roaster frame of this kind which is of extremely simple construction, made entirely from inexpensive wire stock, and lends itself admirably to efficient mass production.

The above and other objects, features and advantages of the present invention will be more fully understood from the following description considered in connection with the accompanying illustrative drawings.

In the drawings:

Fig. 1 is a perspective view of a mounted skewer roaster frame embodying the present invention;

Fig. 2 is a fragmentary section taken on the line 2—2 of Fig. 1; and

Fig. 3 is an end elevation of the mounted skewer frame as viewed in the direction of the arrow 3 in Fig. 1.

Referring to the drawings, the reference numeral 10 designates a skewer roaster frame which is detachably mountable on an oven or open-fire pan 12 for the purpose of roasting, broiling, or otherwise preparing food, and particularly meat.

The instant skewer frame 10, which is particularly suitable for the preparation of poultry, comprises two separate sections 14 and 16 of which the section 14 is provided with a skewer 18 on which meat to be prepared is impaled in a manner well known. The frame section 14 is articulated from a few simple parts, all of which may advantageously be made of inexpensive wire stock. Thus, the frame section 14 comprises rectangularly disposed U-shaped wire members 20 and 22 which are suitably joined at their centrally intersecting yokes 24 and 26, respectively, as by welding, for instance. Suitably secured at 28 to the yoke 24 of the wire member 20, as by welding, is one end of the skewer 18 which is further secured at 30, also by welding, to a wire brace 32 which is, in turn, welded or otherwise secured with its ends to the opposite legs 34, respectively, of the wire member 20. The skewer 18 is thus rigidly secured to the wire member 20 and extends in substantial parallelism with the opposite legs 34 of the latter. The legs 34 of the wire member 20 extend beyond the wire brace 32 to form pointed prongs 36, respectively, for the impalement thereon of the food on the skewer 18. The food impaleable on the skewer 18, though not limited to meat, will for convenience be referred to hereinafter as "meat." Thus, the prongs 36 on the frame section 14 serve to hold the meat on the skewer 18 against rotation relative to the frame section 14, so that the meat is turnable with the latter into pre-assigned angular positions to be described hereinafter. To reinforce the wire members 20 and lend added rigidity to the frame section 14, there is joined, preferably by welding, to the legs 34 and 40 of the wire members 20 and 22, respectively, a wire ring 42 which may also be welded or otherwise secured to the adjacent wire brace 32. The legs 34 and 40 of the wire members 20 and 22, respectively, serve as supporting legs with which the frame section 14 rests on the top rim 44 of the pan 12 in certain pre-assigned angular dispositions thereon. Inasmuch as the wire members 20 and 22 together provide four supporting legs, it is obvious that the frame section 14 may rest on the top rim 44 of the pan 12 in four different angular dispositions thereon of which one is shown in Figs. 1 and 3. Further, since the legs 34 and 40 of the wire members 20 and 22, respectively, lie in rectangularly disposed planes, respectively, and are equally spaced from the intersection of the yokes 24 and 26 of these members, it stands to reason that the frame section 14 will be turned about the skewer 18 as an axis through 90° from any of its pre-assigned angular positions on the pan 12 into the next pre-assigned angular position thereon.

The frame section 14 is further provided with lock members 48 and 50, respectively, which, in the present instance, are U-shaped wire members joined with their yokes 52 and 54, respectively, to the yoke 24 of the wire member 20, as by welding, for instance. The lock members 48 and 50 are so disposed on the wire member 20 that their opposite legs or fingers 56 and 58, respectively, are arranged concentrically of the wire ring 42 and spaced approximately 45° from the adjacent legs 34 and 40 of the wire members 20 and 22, respectively (see also Fig. 3). Each leg or finger of either member 48 or 50 serves as a lock for preventing unauthorized rotation of the frame section 14 from the pre-assigned angular position on the pan 12 in which the adjacent legs 34 and 40 of the wire members 20 and 22, respectively, rest on the pan 12. Thus, in the angular position of the frame section 14 shown in Figs. 1 and 3, the finger 56' of the lock member 48 projects beneath the top rim 44 of the pan 12 and thus prevents any substantial unauthorized turning movement of the frame section 14 into any of its other pre-assigned dispositions on the pan 12. In order to permit turning of the frame section 14 into any of its other pre-assigned dispositions on the pan 12, the former is retracted in the direction of the arrow 57 in Fig. 2 until the finger 56' of the lock member 48 clears the adjacent top rim 44 of the pan 12, whereupon the frame section 14 may be turned.

The frame section 16 comprises, in the present instance, a support 60 which has a U-shaped portion 62 that rests on the top rim 44 of the pan 12, and depending legs 64 which are continuous with the legs 66, respectively, of the U-portion 62. The end of each depending leg 64 of the support 60 is preferably inwardly looped as at 68 (Fig. 2) for a purpose described hereinafter. The frame section 16 further comprises a saddle 70 which is expeditiously made in the form of a semi-circular wire welded or otherwise secured to the U-portion 62 of the support 60. The saddle 70 serves for the rotary support of the skewer 18 in the frame-forming relation of the sections 14 and 16 (Figs. 1 and 2). To prevent the skewer 18 from sliding off the saddle 70, the skewer 18 is passed through a wire fork 74 which is welded or otherwise secured to the saddle 70 and also to the U-portion 62 of the support 60. The saddle 70 extends with its free ends 76 and 78 beneath the U-portions 62 of the support 60 to cooperate with the depending legs 64 on the latter in releasably holding the frame section 16 on the top rim 44 of the pan 12. More particularly, the support 60 is, by virtue of the provision of the looped ends 68 of the somewhat resilient depending legs 64 thereof, snapped on the pan 12 and resiliently held thereon, as will be readily understood from Fig. 2. For removing the support 60 from the pan 12, the former is sprung from the top rim 44 of the latter in a self-explanatory manner.

In using the roaster frame 10, the frame section 16 may be snapped on the top rim 44 of the pan 12, ready for the reception and support of the skewer 18 of the companion frame section 14. After impaling meat on the skewer 18 and also on the prongs 36 of the frame section 14, the pointed end 18' of the skewer 18 may next be passed through the fork 74 on the top of the saddle 70 of the mounted frame section 16, whereupon the frame section 14 may be placed with its legs 34' and 40', for instance, on the top rim 44 of the pan 12 in the fashion shown in Fig. 2. The frame section 14 may then be locked against unauthorized rotation about the skewer 18 as an axis, by sliding the frame section 14 on the top rim 44 of the pan 12 in a direction opposite to the arrow 57 in Fig. 2, until the finger 56' of the lock member 48 projects beneath the top rim 44 of the pan 12. The frame section 14 with the impaled meat thereon may, after appropriate time intervals, be turned by an attendant successively into the previously described angular dispositions on the pan 12 on first releasing the frame section 14 each time by retracting the latter in the direction of the arrow 57 in Fig. 2 until the presently locking finger of the respective lock member 48 or 50 clears the top rim 44 of the pan 12.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. A skewer roaster frame for attachment to a pan having a laterally projecting top flange, said frame comprising a first frame member providing a support and having parts for its releasable attachment to a pan so that said support is in position above the latter, and a second frame member having a projecting skewer and parts symmetrically spaced and radially projecting from the skewer axis for the removable placement of said second member in different angular dispositions, respectively, on the top flange of a pan at a distance from the intended attachment thereto of said first member, said parts being in fixed relation to said projecting skewer, said skewer being adapted to span said distance and rest on the support of said first member when the latter is attached to the same pan.

2. A skewer roaster frame as set forth in claim 1, in which the parts of said second frame member are angularly spaced pairs of opposite legs, respectively, of which the legs of each pair extend substantially parallel to and are equi-distant from the skewer axis, one pair of legs having pointed prongs for the impalement thereon of the food on said projecting skewer.

3. A skewer roaster frame for attachment to a pan having a laterally projecting top flange, said frame comprising a first frame member providing a support and having parts for its releasable attachment to a pan so that said support is in position above the latter, and a second frame member having a projecting skewer and pairs of spaced legs extending substantially parallel to, and being equi-distant from, the skewer axis and angularly spaced about the latter for removably slidably supporting said second member in different angular dispositions, respectively, on the top flange of a pan at a distance from the intended attachment to the latter of said first member, one pair of spaced legs being provided with pointed prongs, said skewer being adapted to span said distance and slidably rest on the support of said first member when the latter is attached to the same pan, and said second member has fingers symmetrically spaced between the legs of said pairs, respectively, projectible underneath, and retractible from, the top flange of the pan on sliding said second frame in said angular dispositions, respectively, back and forth on the pan while remaining supported on the latter, for locking said second member against, and release it for, turning movement, respectively, about the skewer axis.

4. A skewer roaster frame as set forth in claim 3, in which said fingers extend substantially parallel to said skewer and are located together with said legs in a circle the center of which coincides with the skewer axis.

5. A skewer roaster frame as set forth in claim 3, in which said first member further comprises an inverted fork traversing said support thereof and adapted to straddle the skewer when resting on the latter, said fork being of a width to restrain the skewer from swinging through a substantial distance in the plane of the pan to which the frame is attached, and of a height to permit lifting of said second member from the top flange of the pan through a sufficient distance to permit rotation of said second member about the axis of said skewer while the latter rests on said support and extends through said fork.

6. A skewer roaster frame for attachment to a pan having a laterally projecting top flange, comprising a first frame member providing a support and having parts for its releasable attachment to a pan so that said support is in position above the latter, and a second frame member comprising two U-shaped wire elements each having substantially parallel legs and a connecting yoke and both being secured to each other at their centrally rectangularly intersecting yokes with their legs extending in the same direction, and a skewer secured with one end to said elements at their intersection and extending forward of said legs and substantially parallel to the latter, said legs being adapted for the support of said second member on the top flange of the pan in four different angular positions thereon in either one of which said skewer is adapted to rest on said support of the first member when the latter is attached to the same pan remotely from said second member.

7. A skewer roaster frame as set forth in claim 6, in which said second member further comprises a wire ring which extends in a plane parallel to that in which the intersecting yokes of said wire elements extend and to which the legs of the latter are secured for reenforcement.

8. A skewer roaster frame as set forth in claim 6, in which the legs of one of said elements are pointed at their ends and extend forwardly of the legs of the other of said elements to serve as prongs on which to impale food on the skewer.

9. A skewer roaster frame as set forth in claim 6, in which said second member further comprises two U-shaped wire parts each having substantially parallel legs and a connecting yoke and both being secured with their respective yokes to the yoke of one of said wire elements in rectangularly intersecting relation therewith at points, respectively, substantially midway between the center of the yoke and the legs, respectively, of said one element, the legs of said parts extending substantially parallel to, and in the same direction as, the legs of said elements and are located, together with the latter legs, in a circle the center of which substantially coincides with the skewer axis, the legs of said parts being adapted to project underneath the top flange of the pan in said different angular positions, respectively, of said second member for releasably locking the latter against turning movement from either into the other of said angular positions.

10. A skewer roaster frame as set forth in claim 6, in which said first frame member comprises a resilient wire clip snappable over the top flange of a pan into clamping engagement with the adjacent side wall of the latter, a wire saddle constituting said support and being secured to and projecting from said clip so as to be above the top flange of the pan when said clip is snapped on the latter, and an inverted wire fork having a yoke above said saddle and legs secured to the latter and being adapted to straddle said skewer when resting on said saddle.

11. A skewer roaster frame as set forth in claim 6, in which said first frame member comprises a resilient wire clip snappable over the top flange of a pan into clamping engagement with the adjacent side wall of the latter, a wire saddle constituting said support and being secured to and projecting from said clip so as to be above the top flange of the pan when said clip is snapped on the latter, and an inverted wire fork having a yoke above said saddle and legs secured to the latter and to said clip and being adapted to straddle said skewer when resting on said saddle.

JAMES J. JACOBSON.

REFERENCES CITED

The following references are of record in the file of this patent:

UNITED STATES PATENTS

| Number | Name | Date |
|---|---|---|
| 17,259 | Brown et al. | May 12, 1857 |
| 472,595 | Wachs | Apr. 12, 1892 |
| 652,660 | Bradlee | June 26, 1900 |
| 730,525 | Edgar | June 9, 1903 |
| 1,085,671 | Day | Feb. 3, 1914 |
| 1,888,616 | Bocchino | Nov. 22, 1932 |
| 2,335,217 | Tate | Nov. 23, 1943 |
| 2,374,302 | Orkfritz | Apr. 24, 1945 |
| 2,485,890 | Keljik | Oct. 25, 1949 |
| 2,511,594 | Loffredo | June 13, 1950 |

FOREIGN PATENTS

| Number | Country | Date |
|---|---|---|
| 99,138 | Germany | Feb. 13, 1898 |
| 180,350 | Switzerland | May 1, 1936 |
| 845,826 | France | May 22, 1939 |